(12) United States Patent
Abatzoglou

(10) Patent No.: US 8,237,605 B2
(45) Date of Patent: Aug. 7, 2012

(54) TARGET DETECTION FROM A SLOW MOVING RADAR PLATFORM

(75) Inventor: Theagenis J. Abatzoglou, Huntington Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/887,047

(22) Filed: Sep. 21, 2010

(65) Prior Publication Data
US 2012/0068881 A1    Mar. 22, 2012

(51) Int. Cl.
G01S 13/00    (2006.01)

(52) U.S. Cl. ............. 342/28; 342/27; 342/104; 342/192

(58) Field of Classification Search .............. 342/27–28, 342/104, 192
See application file for complete search history.

(56) References Cited

U.S. PATENT DOCUMENTS

| | | | |
|---|---|---|---|
| 4,210,911 | A | 7/1980 | Jacomini |
| 5,559,518 | A | 9/1996 | DiDomizio |
| 5,784,026 | A | 7/1998 | Smith et al. |
| 5,818,383 | A | 10/1998 | Stockburger et al. |
| 6,400,306 | B1 | 6/2002 | Nohara et al. |
| 6,633,253 | B2 | 10/2003 | Cataldo |
| 6,756,935 | B1 | 6/2004 | Cameron et al. |
| 6,809,681 | B1 | 10/2004 | Niechayev |
| 6,911,933 | B1 | 6/2005 | Mutz et al. |
| 7,038,618 | B2 | 5/2006 | Budic |
| 7,064,702 | B1 | 6/2006 | Abatzoglou |
| 7,106,243 | B2 | 9/2006 | Krikorian et al. |
| 7,109,911 | B1 | 9/2006 | Cataldo |
| 7,193,558 | B1 | 3/2007 | Gerlach et al. |
| 7,286,079 | B2 | 10/2007 | Blunt et al. |
| 7,369,083 | B2 | 5/2008 | Budic |
| 7,576,682 | B1 * | 8/2009 | Yu ................................... 342/90 |
| 7,652,614 | B2 | 1/2010 | Venkatachalam et al. |
| 2009/0135046 | A1 | 5/2009 | Steele |
| 2010/0109938 | A1 | 5/2010 | Oswald et al. |

FOREIGN PATENT DOCUMENTS

WO    0237137 A1    5/2002

OTHER PUBLICATIONS

Abatzoglou T.J., et al., "Range, Radial Velocity, and Acceleration MLE using Radar LFM Pulse Train," IEEE Transactions on Aerospace and Electronic Systems IEEE USA, 34:4(1070-1083), Oct. 4, 1998.

* cited by examiner

*Primary Examiner* — Timothy A Brainard
(74) *Attorney, Agent, or Firm* — Pierce Atwood LLP; Joseph M. Maraia

(57) ABSTRACT

The target detection from a slow moving radar platform technology includes a system. The system includes a radar power determination module configured to determine a clutter power based on radar information associated with a radar signal. The system further includes a maximum likelihood determination module configured to determine a plurality of maximum likelihoods from the radar signal within a plurality of substantially equally spaced frequencies and based on the clutter power. The system further includes a maximum threshold determination module configured to determine a maximum threshold from the plurality of maximum likelihoods and based on the clutter power. The system further includes a target detection module configured to detect the target based on the maximum threshold and a target detection threshold.

20 Claims, 10 Drawing Sheets

TARGET DETECTION FROM A SLOW MOVING RADAR PLATFORM

GOVERNMENT SUPPORT

The invention was supported, in whole or in part, by a grant HR0011-09-C-0036 from United States Department of Defense. The Government has certain rights in the invention.

BACKGROUND

Target detection from a slow moving radar platform can be challenging, if not impossible, due to the Doppler extent of the clutter produced by the radar platform motion. In this regard, when the radar platform is moving slowly and the dwell duration is small, the target detection is limited by the Doppler resolution of the dwell. Prior attempts at target detection utilized Doppler filtering to isolate the target from ground clutter. However, the minimal detection velocity is generally not small enough to effectively and accurately detect targets utilizing Doppler filtering. Thus, a need exists in the art for improved target detection from a slow moving radar platform.

SUMMARY

One approach to target detection is a system. The system includes a radar power determination module configured to determine a clutter power based on radar information associated with a radar signal. The system further includes a maximum likelihood determination module configured to determine a plurality of maximum likelihoods from the radar signal within a plurality of substantially equally spaced frequencies and based on the clutter power. The system further includes a maximum threshold determination module configured to determine a maximum threshold from the plurality of maximum likelihoods and based on the clutter power. The system further includes a target detection module configured to detect the target based on the maximum threshold and a target detection threshold.

Another approach to target detection is a system. The system includes a means for determining a clutter power based on radar information associated with a radar signal. The system further includes a means for determining a plurality of maximum likelihoods from the radar signal within a plurality of substantially equally spaced frequencies and based on the clutter power. The system further includes a means for determining a maximum threshold from the plurality of maximum likelihoods and based on the clutter power. The system further includes a means for detecting the target based on the maximum threshold and a target detection threshold.

Another approach to target detection is a method. The method includes determining a clutter power based on radar information associated with a radar signal. The method further includes detecting the target based on a maximum threshold and a target detection threshold. The method further includes determining a plurality of maximum likelihoods from the radar signal within a plurality of substantially equally spaced frequencies and based on the clutter power. The method further includes determining the maximum threshold from the plurality of maximum likelihoods and based on the clutter power.

Another approach to target detection is a computer program product. The computer program product is tangibly embodied in an information carrier. The computer program product includes instructions being operable to cause a data processing apparatus to determine a clutter power based on radar information associated with a radar signal. The computer program product further includes instructions being operable to cause a data processing apparatus to detect the target based on a maximum threshold and a target detection threshold. The computer program product further includes instructions being operable to cause a data processing apparatus to determine a plurality of maximum likelihoods from the radar signal within a plurality of substantially equally spaced frequencies and based on the clutter power. The computer program product further includes instructions being operable to cause a data processing apparatus to determine the maximum threshold from the plurality of maximum likelihoods and based on the clutter power.

In other examples, any of the approaches above can include one or more of the following features.

In some examples, the system further includes a transceiver configured to receive the radar signal.

In other examples, the system further includes a radar signal processor configured to determine the radar information based on the radar signal.

In some examples, the system has a translational velocity of substantially 1 to 20 meters per second.

In other examples, the radar signal includes reflections from a target object and the target object has a Doppler velocity of substantially 0.2 to 1.0 meters per second.

In some examples, the maximum likelihood determination module is further configured to determine the plurality of substantially equally spaced frequencies based on the clutter power and the radio signal.

In other examples, the clutter power includes clutter Doppler spread.

In some examples, the maximum likelihood determination module is further configured to determine the plurality of maximum likelihoods from the radar signal within a plurality of substantially equally spaced frequencies and based on the clutter power utilizing a fast fourier transform.

In other examples, the maximum threshold determination module is further configured to determine the maximum threshold from the plurality of maximum likelihoods and based on the clutter power utilizing Newton's method.

In some examples, the radar information includes radar bandwidth, antenna bandwidth, radar platform velocity, and/or antenna angle.

In other examples, the clutter power includes clutter Doppler spread.

In some examples, the clutter power is indicative of a distribution of clutter power density.

In other examples, the determined clutter power spectral density is calculated in accordance with equation:

$$P_C(f) = \alpha P_C \left( \frac{\sin(\pi f / BW_C)}{\pi f / BW_C} \right)^4$$

wherein:
$P_c$=Clutter Power,
f=frequency, $$BW_C = \text{Doppler bandwidth of clutter} = \left(2\frac{v_r}{\lambda}\sin\theta\right)\Delta\theta_C,$$

$\Delta\theta_c$=peak-to-null antenna beamwidth/3-dB beamwidth,
$v_r$=radar platform velocity,
$\alpha$=3⁄2, and
$\theta$=angle of antenna boresight to platform velocity.

In some examples, the method further includes determining the plurality of maximum likelihoods from the radar signal within the plurality of substantially equally spaced frequencies and based on the clutter power utilizing a fast fourier transform.

In other examples, the determined maximum threshold is calculated in accordance with equation:

$$f_{k+1} = f_k - Re\left\{\frac{\vec{x}^* H'(f_k)}{\vec{x}^* H''(f_k)}\right\}$$

wherein ($\vec{x}$) is calculated in accordance with equation:

$$\vec{x} = Ae^{j\Phi}\vec{e}(f_D) + \vec{c} + \vec{u}$$

wherein:

$\vec{e}(f_D) = [e^{-j2\pi NTf} \ldots e^{j2\pi nTf} \ldots e^{j2\pi NTf}]^t$ = target Doppler phase steering vector $\vec{c}$ = clutter vector, $\vec{u}$ = electronic noise vector, and $Ae^{j\Phi}$ = Complex envelope of target; and wherein $H(f_k)$ is calculated in accordance with equation:

$$H(f_k) = \frac{Q^{-1}\vec{e}(f)}{(\vec{e}(f)^* Q^{-1}\vec{e}(f))^{1/2}}$$

wherein:

$\vec{e}(f_D) = [e^{-j2\pi NTf} \ldots e^{j2\pi nTf} \ldots e^{j2\pi NTf}]^t$ = target Doppler phase steering vector wherein (Q) is calculated in accordance with equation:

$$Q(m,n) = E\{(c_m + u_m)(c_n + u_n)^*\} = Q_c(m,n) + Q_u(m,n),$$

$$Q_c(m,n) = \int P_c(f)e^{j2\pi(m-n)Tf} df = P_c(1 - (m-n)T \times BW_c),$$

$$Q_u(m,n) = \sigma^2 \delta_{m,n},$$

$P_c$ = Clutter power, $\sigma^2$ = electronic noise power, and m and n = delays in time.

In some examples, the detection of the target is calculated in accordance with equation:

$$\underset{f}{\text{Max}}\left\{\frac{|\vec{x}^* Q^{-1}\vec{e}(f)|^2}{\vec{e}(f)^* Q^{-1}\vec{e}(f)}\right\} \geq \text{Target Detection Threshold}$$

In other examples, the radar signal is defined by (x) in accordance with equation:

$$x_n = Ae^{j\Phi}e^{j2\pi nTfD} + c_n + u_n$$

wherein:

n = N, ..., 0, ..., N radar pulses, $Ae^{j\Phi}$ = Complex envelope of target, $f_D$ = Target Doppler Frequency, $c_n$ = Clutter return samples, $u_n$ = Electronic noise samples, and T = inter-pulse period.

In some examples, the radar signal comprising a plurality of target Doppler frequencies, wherein the radar signal is defined by (x) in accordance with equation:

$$x_n = \sum_{k=1}^{m} A_k e^{j\phi_k} e^{j2\pi nTf_{D,k}} + c_n + u_n$$

wherein:

n = −N, ..., 0, ..., N radar pulses, $Ae^{j\Phi}$ = Complex envelope of target, $f_D$ = Target Doppler Frequency, $c_n$ = Clutter return samples, $u_n$ = Electronic noise samples, m = Number of Target Doppler Frequencies, and T = inter-pulse period;

wherein ($\vec{e}$) is defined in accordance with equation:

$$E(f_1 \ldots f_m) = [\vec{e}(f) \ldots \vec{e}(f_m)]$$

wherein $(f_1) \ldots (f_m)$ are defined in accordance with equation:

$$\underset{f_1 \ldots f_m}{\text{Max}}$$

$$\{\vec{x}^* Q^{-1} E(f_1 \ldots f_m)(E(f_1 \ldots f_m)^* Q^{-1} E(f_1 \ldots f_m))^{-1} E(f_1 \ldots f_m)^* Q^{-1} \vec{x}\}$$

The target detection techniques described herein can provide one or more of the following advantages. An advantage to the target detection utilizing a maximum likelihood technique is that minimum detection velocity is improved by as much as a factor of three over conventional Doppler filtering with a smaller computational load factor, thereby increasing the speed to detect a target while decreasing the required computing resources needed for such target detection. Another advantage to the target detection is the maximum likelihood detection utilizing the clutter power associated with the radar signal can be explicitly modeled, thereby increasing the likelihood of accurate target detection while increasing the efficiency of the target detection process due to the explicit clutter power calculations.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The target detection method and apparatus includes technology that, generally, detects targets from a slow moving or stationary radar platform (e.g., water based platform, tracked vehicle based platform, etc.). The technology utilizes an explicit model of ground clutter power to detect targets, thereby increasing the likelihood of accurate target detection and decreasing the minimal detection velocity (MDV). The technology can detect targets from the slow moving radar platform that has, for example, a small translational velocity (e.g., 1 meter per second, 5 meters per second, 20 meters per second, etc.) and/or can detect target objects that have, for example, a small Doppler velocity (e.g., 0.2 meters per second, 0.5 meters per second, etc.).

Figure 1:
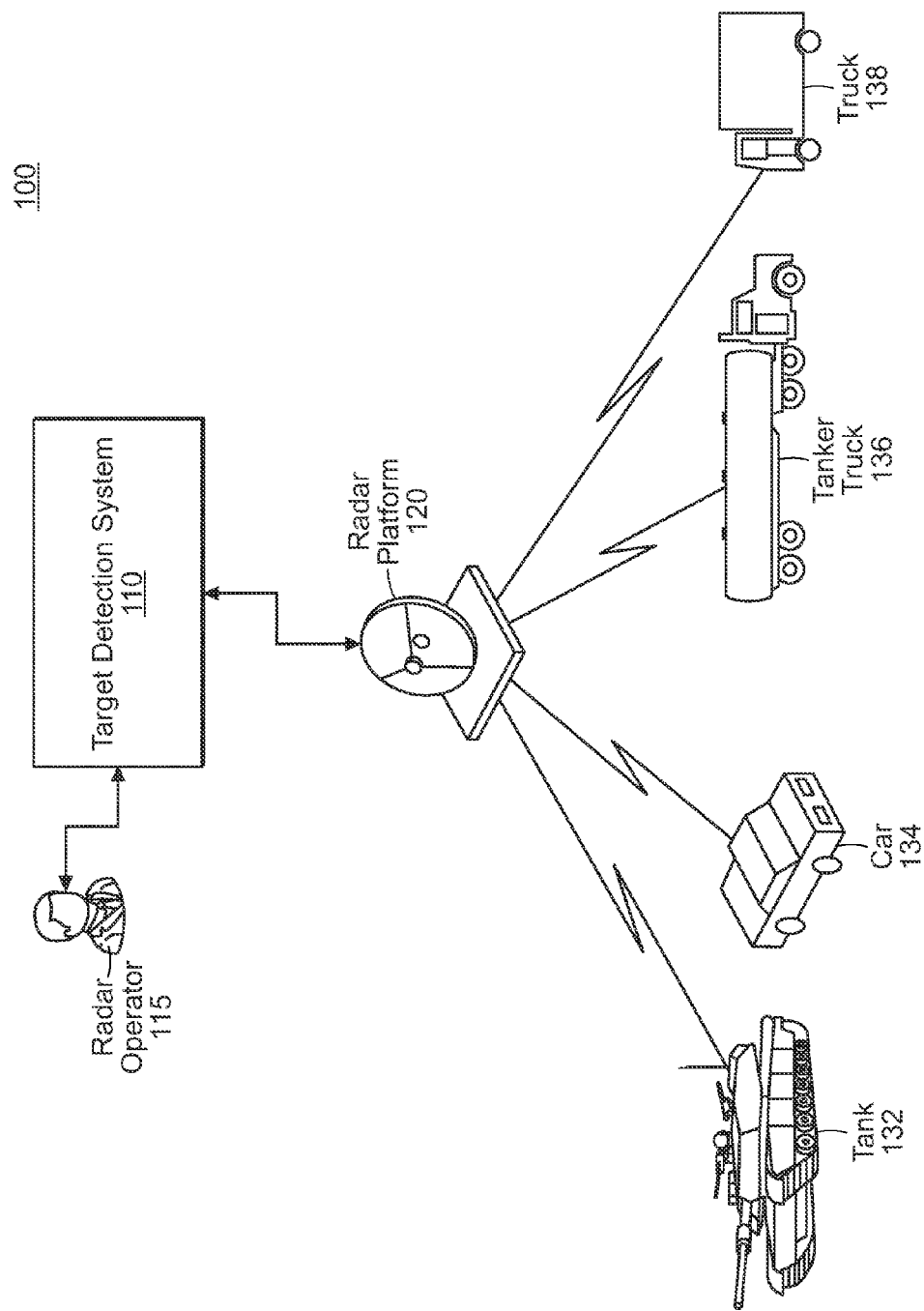
FIG. 1 is a diagram of an exemplary target detection environment.

FIG. 1 is a diagram of an exemplary target detection environment 100. The environment 100 includes a target detection system 110 and a radar platform 120. A radar operator 115 tracks a plurality of target objects utilizing the system 110. The plurality of target objects includes a tank 132, a car 134, a tanker trailer 136, and a truck 138. The radar platform 120 transmits electromagnetic waves (e.g., high range resolution radar, synthetic aperture radar, etc.) at the target object and receives reflections of the electromagnetic waves from the target object. The radar platform 120 communicates data (e.g., radar signal, radar information, etc.) from the reflections of the electromagnetic waves to the target detection system 110.

The target detection system 110 determines a clutter power (e.g., value of the power reflected from the ground-based objects, expected value of the power reflected from the ground-based objects, etc.) based on the received data (e.g., radar platform velocity, radar beam angle, etc.). The target detection system 110 determines a plurality of maximum likelihoods from the radar signal within a plurality of substantially equally spaced frequencies and based on the clutter power. The target detection system 110 determines a maximum threshold from the plurality of maximum likelihoods and based on the clutter power. The target detection system 110 detects the target based on the maximum threshold and a target detection threshold.

Figure 4A:
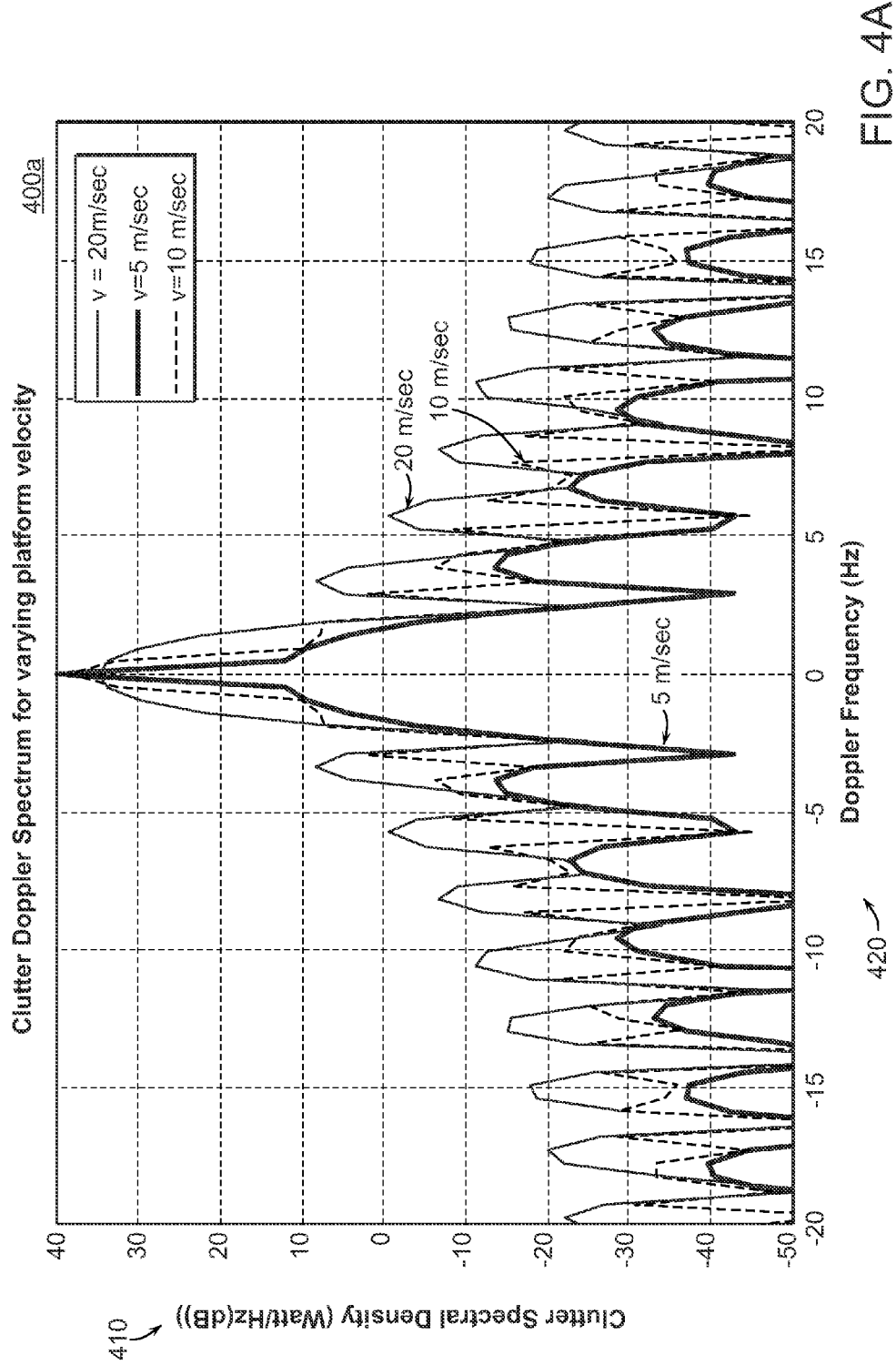
FIG. 4A is a chart illustrating an exemplary clutter Doppler spectrum at various radar platform velocities.

Table 1 illustrates exemplary maximum clutter powers and data (in this example, radar platform velocity and radar beam angle), as illustrated in FIG. 4A.

TABLE 1

Exemplary Clutter Power

| Signal Identifier | Radar Platform Velocity | Radar Beam Angle | Maximum Clutter Power |
|---|---|---|---|
| A23 | 5 meters per second | 0.2 degrees | 38 dB |
| A24 | 10 meters per second | 0.2 degrees | 39 dB |
| A25 | 20 meters per second | 0.2 degrees | 34 dB |

Figure 4B:
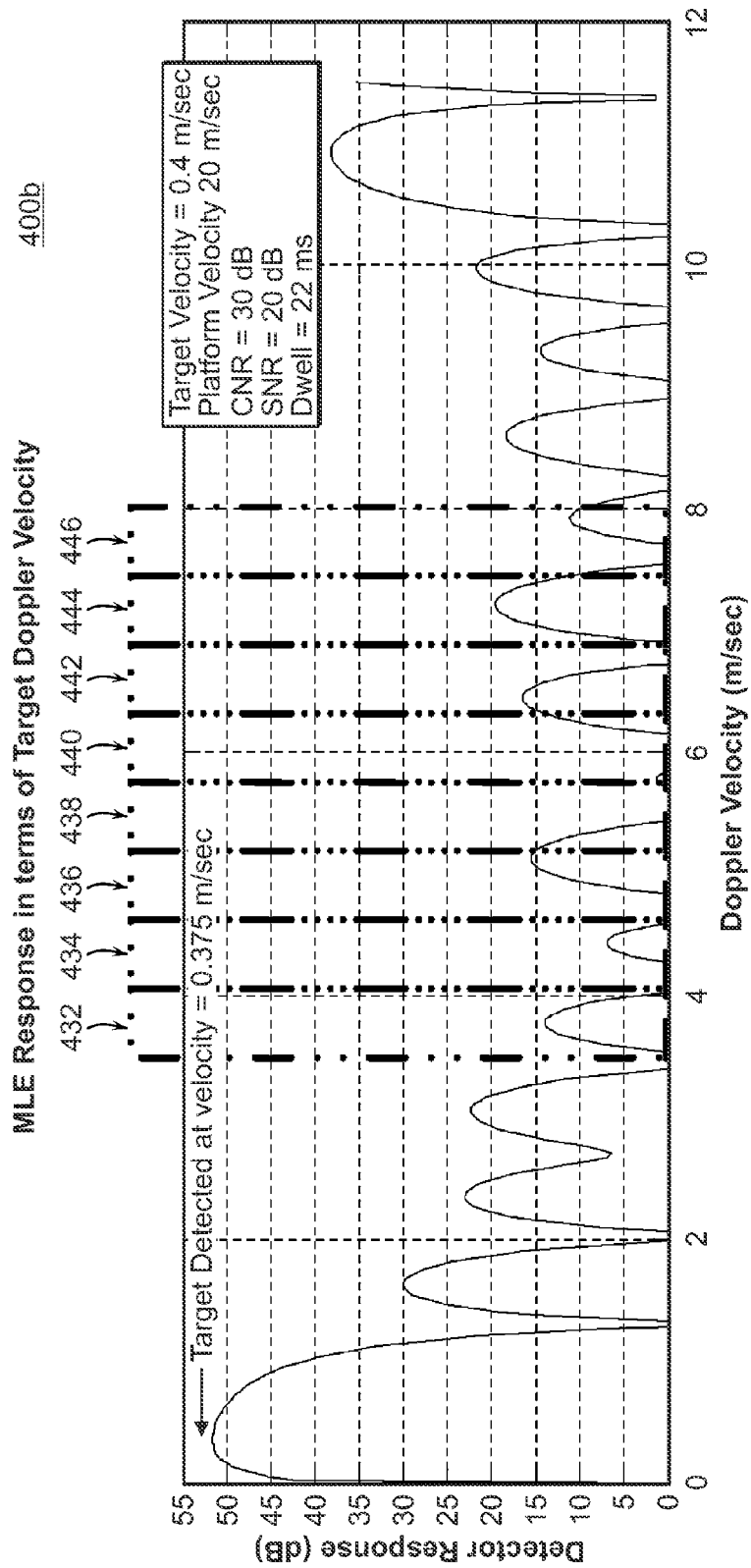
FIG. 4B is a chart illustrating an exemplary target detection Doppler velocities.

Table 2 illustrates exemplary maximum likelihoods within substantially equally spaced frequencies, as illustrated in FIG. 4B.

TABLE 2

Exemplary Maximum Likelihoods

| Likelihood Identifier | Start | End | Maximum Likelihood |
|---|---|---|---|
| 432 | 3.8 m/s | 4.1 m/s | 14 dB |
| 434 | 4.1 m/s | 4.4 m/s | 7 dB |

TABLE 2-continued

Exemplary Maximum Likelihoods

| Likelihood Identifier | Start | End | Maximum Likelihood |
|---|---|---|---|
| 436 | 4.4 m/s | 4.7 m/s | 16 dB |
| 438 | 4.7 m/s | 5.0 m/s | 15 dB |

Figure 5A:
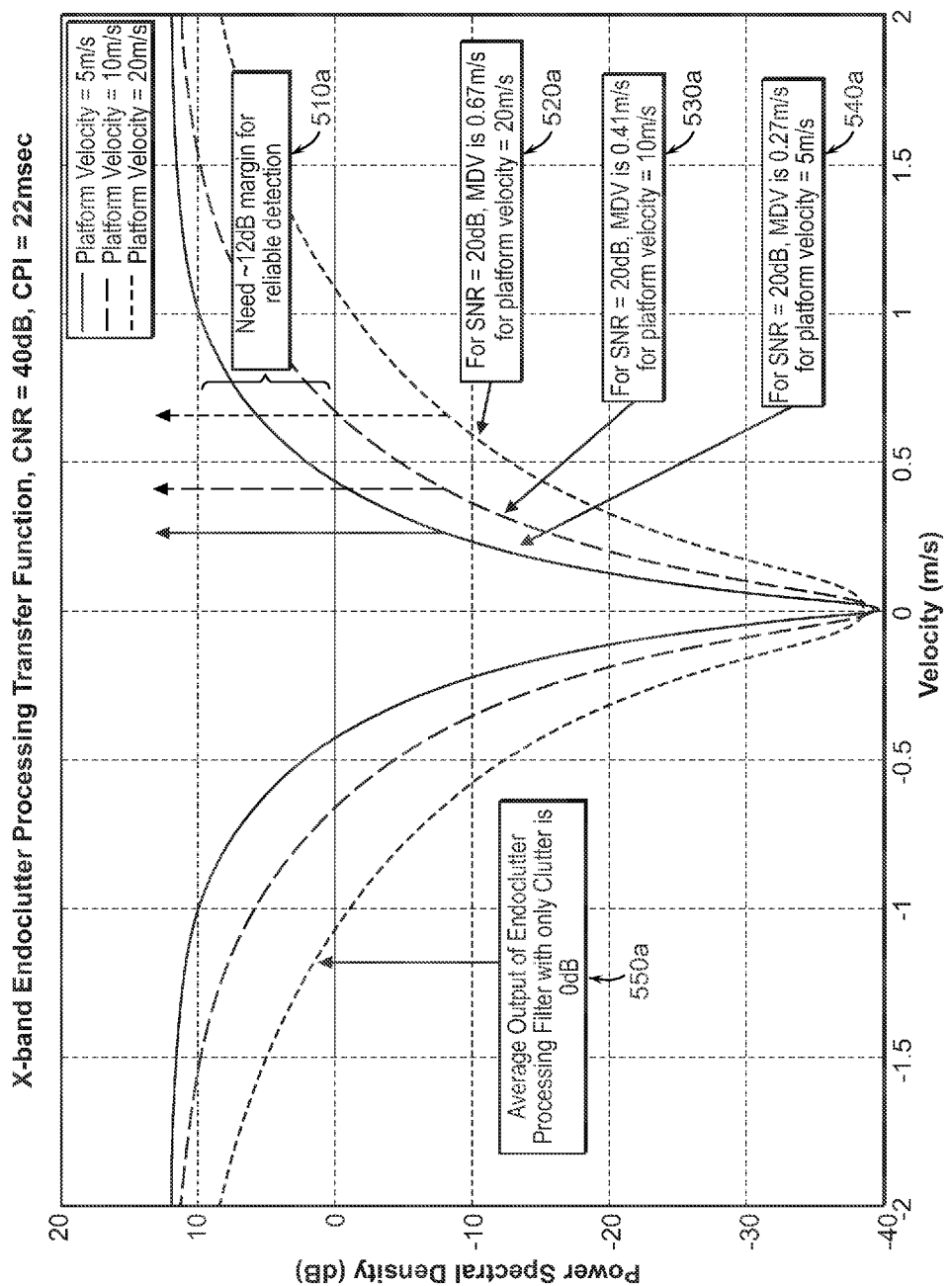
FIGS. 5A-5C are charts illustrating exemplary radar signals.

The target detection system 110 determines a maximum threshold from the plurality of maximum likelihoods, as illustrated in Table 1, and based on the clutter power (in this example, the maximum likelihood is 39 dB for the likelihood identifier A24). The target detection system 110 detects the target based on the maximum threshold (in this example, 30 dB) and a target detection threshold (e.g., 5 dB, 42 dB, etc.). Table 3 illustrates exemplary maximum thresholds and target detection thresholds, as illustrated in FIG. 5A.

TABLE 3

Exemplary Maximum Thresholds and Target Detection Thresholds

| Detection Identifier | Threshold Detection at signal/noise ratio = 20 dB | Target Detection Threshold | Variable Target Detection Threshold | Target Detection |
|---|---|---|---|---|
| 520a | 0.67 m/s | 0 dB | 12 dB | Yes above 0.67 m/s |
| 530a | 0.41 m/s | 0 dB | 12 dB | Yes above 0.41 m/s |
| 540a | 0.27 m/s | 0 dB | 12 dB | Yes above 0.27 m/s |

Figure 2:
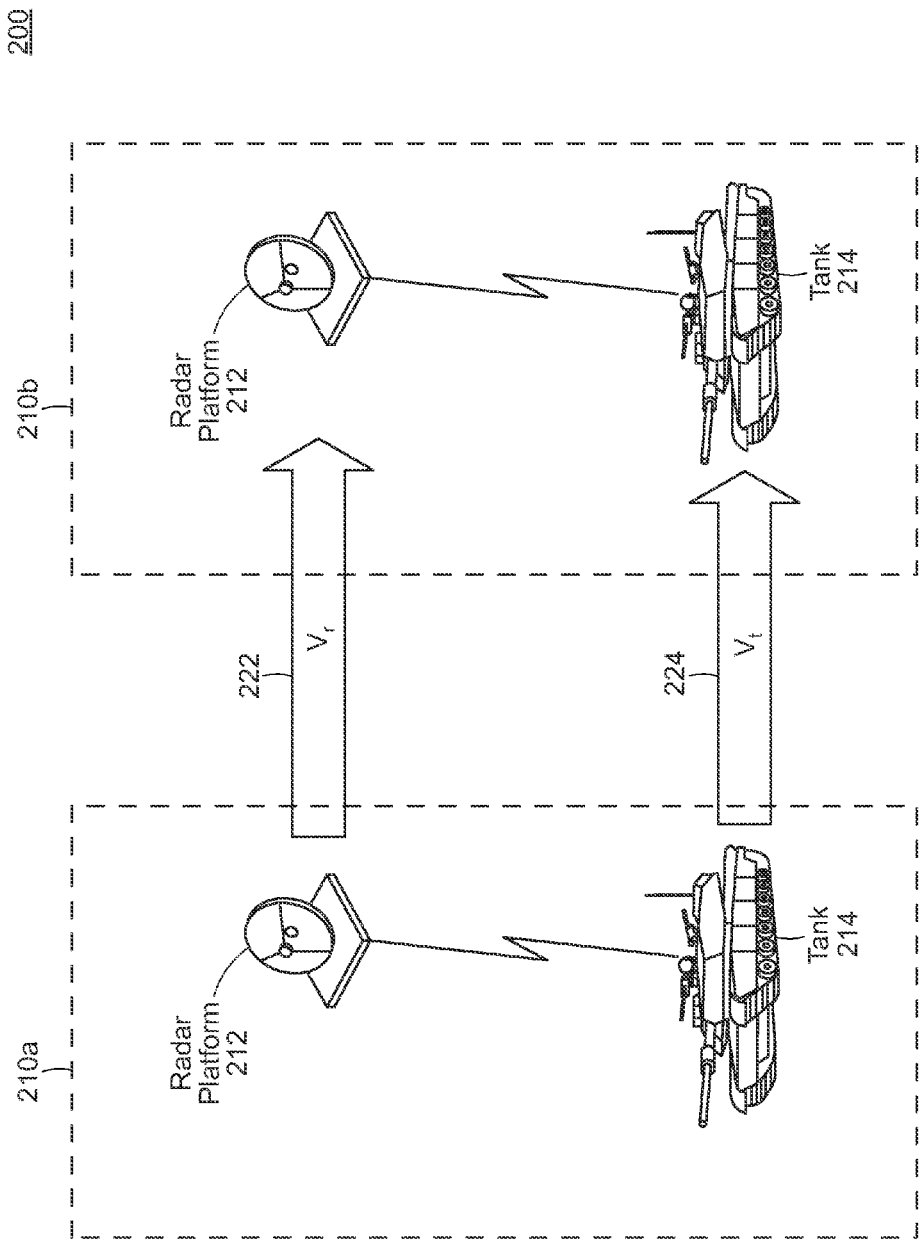
FIG. 2 is a diagram of another exemplary target detection environment.

FIG. 2 is a diagram of another exemplary target detection environment 200. The target environment 200 illustrates target detection at two time frames A 210a and B 210b. At time A 210a, a radar platform 212 and a tank 214 are at a first position (e.g., the physical location of the radar platform 212 is in square 3×4 and the physical location of the tank 214 is in square 3×8). At time B 210b, the radar platform 212 and the tank 214 are at a second position (e.g., the physical location of the radar platform 212 is in square 3×5 and the physical location of the tank 214 is in square 9×8). During the time period between time A 210a and time B 210b, the radar platform 212 moved from the first position to the second position at a velocity $V_r$ 222 and the tank 214 moved from the first position to the second position at a velocity $V_t$ 224.

In some examples, the radar platform has a translational velocity (in this example, $V_r$) of substantially 1 to 20 meters per second. In other examples, the received radar signal includes reflections from a target object and the target object (in this example, the tank) has a velocity of substantially 0.2 to 5.0 meters per second (in this example, $V_t$).

Figure 3:
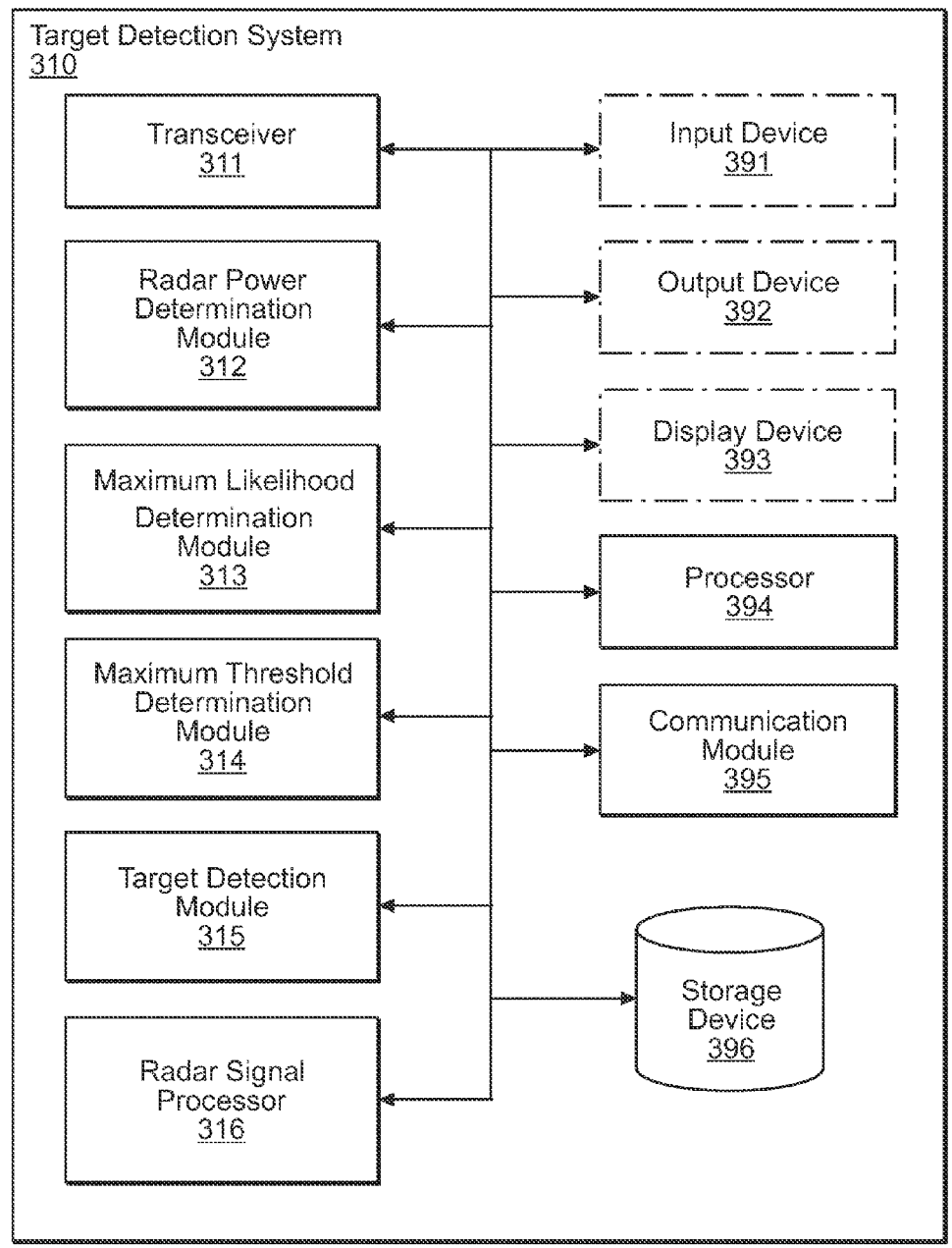
FIG. 3 is a block diagram of an exemplary target detection system.

FIG. 3 is a diagram of an exemplary target detection system 310. The target detection system 310 includes a transceiver 311, a radar power determination module 312, a maximum likelihood determination module 313, a maximum threshold determination module 314, a target detection module 315, a radar signal processor 316, an input device 391, an output device 392, a display device 393, a processor 394, a communication module 395, and a storage device 396. The modules and devices described herein can, for example, utilize the processor 394 to execute computer executable instructions and/or include a processor to execute computer executable instructions (e.g., an encryption processing unit, a field programmable gate array processing unit, etc.). It should be understood that the target detection system 310 can include, for example, other modules, devices, and/or processors known in the art and/or varieties of the illustrated modules, devices, and/or processors.

The transceiver 311 receives the radar signal (e.g., from a radar platform, from an intermediate radar signal processing device, etc.). The radar power determination module 312 determines a clutter power based on radar information associated with the received radar signal. In some examples, the clutter power includes a clutter Doppler spread.

The maximum likelihood determination module 313 determines a plurality of maximum likelihoods from the received radar signal within a plurality of substantially equally spaced frequencies and based on the clutter power. In some examples, the maximum likelihood determination module 313 determines the plurality of substantially equally spaced frequencies based on the clutter power and the received radar signal. In other examples, the maximum likelihood determination module 313 determines the plurality of maximum likelihoods from the radar signal within a plurality of substantially equally spaced frequencies and based on the clutter power utilizing a fast fourier transform.

The maximum threshold determination module 314 determines a maximum threshold from the plurality of maximum likelihoods and based on the clutter power. In some examples, the maximum threshold determination module 314 determines the maximum threshold from the plurality of maximum likelihoods and based on the clutter power utilizing Newton's method.

The target detection module 315 detects the target based on the maximum threshold and a target detection threshold. For example, the target detection module 315 determines if the maximum threshold is above the target detection threshold. The radar signal processor 316 determines the radar information based on the radar signal. For example, the radar signal processor 316 extracts the radar angle and the platform speed from the received radar signal.

The input device 391 receives information associated with the target detection system 310 (e.g., instructions from a user, instructions from another computing device, etc.) from a user (not shown) and/or another computing system (not shown). The input device 391 can include, for example, a keyboard, a scanner, etc. The output device 392 outputs information associated with the target detection system 310 (e.g., information to a printer (not shown), information to a speaker, etc.).

The display device 393 displays information associated with the target detection system 310 (e.g., status information, configuration information, etc.). The processor 394 executes the operating system and/or any other computer executable instructions for the target detection system 310 (e.g., executes applications, etc.).

The communication module 395 communicates information to/from the target detection system 310. The communication module 395 can receive, for example, information associated with a radar platform. The information associated with the radar platform can be associated with a data signal (e.g., data signal from a radar platform, processed data signal from a radar platform, data signal from a motion sensor, data signal from an IFF system, data signal from a global positioning system, data signal from a location system, etc.). Each data signal can be associated with a target object (e.g., data signal of a truck by a radar system at time 1.5 seconds, data signal of a truck by a radar system at time 4.5 seconds, etc.). In some examples, a plurality of data signals are associated with the same target object (e.g., the first and the second data signal are associated with a first target object, data signals A-Z are associated with a target object, etc.). Table 4 illustrates exemplary data signals.

TABLE 4

Exemplary Data Signals

| Data Signals | Target Object | Data Signal | Time | Range |
|---|---|---|---|---|
| A4 | Tank 132 | Radar | +3.44 seconds | 210 meters |
| B9 | Tank 132 | Radar | +3.44 seconds | 154 meters |
| C3 | Truck 138 | Motion Sensor A3 | +4.32 seconds | 94 meters |
| LM | Tank 132 | Radar | +4.52 seconds | 342 meters |
| HN | Truck 138 | Radar | +5.34 seconds | 453 meters |
| RE | Tank 132 | Motion Sensor A3 | +5.45 seconds | 96 meters |

The storage device 396 stores the radar signals (e.g., actual radar signal, processed radar signal, etc.), the target detections, and/or any other data associated with the target detection system 310. The storage device 396 can store radar information and/or any other data associated with the target detection system 310. The storage device 396 can include a plurality of storage devices and/or the target detection system 310 can include a plurality of storage devices (e.g., a ratio storage device, a target profile storage device, etc.). The storage device 396 can include, for example, long-term storage (e.g., a hard drive, a tape storage device, flash memory, etc.), short-term storage (e.g., a random access memory, a graphics memory, etc.), and/or any other type of computer readable storage.

FIG. 4A is a chart 400a illustrating an exemplary clutter Doppler spectrum at various radar platform velocities. The chart 400 illustrates clutter spectral density 410 by Doppler frequency 420.

FIG. 4B is a chart 400b illustrating an exemplary target detection Doppler velocities. As illustrated in the chart 400b, the target detection Doppler velocities are divided into substantially equaled spaced frequencies 432, 434, 436, 438, 440, 442, 444, and 446.

FIG. 5A is a chart 500a illustrating an exemplary radar signal for threshold detection. FIG. 5A illustrates the minimum detection threshold for a scenario where the clutter/noise ratio (CNR)=40 dB, signal/noise ratio (SNR)=20 dB, dwell length=22 msec. the platform (radar) velocity is set at: 5 (540a), 10 (530a) and 20 (520a) m/sec. For each platform velocity the minimum detection value (MDV) (510a) is obtained at the point where the clutter processing filter is 12 dB above the expected average power of the clutter filter (550a) when only clutter and thermal noise are present.

Figure 5B:
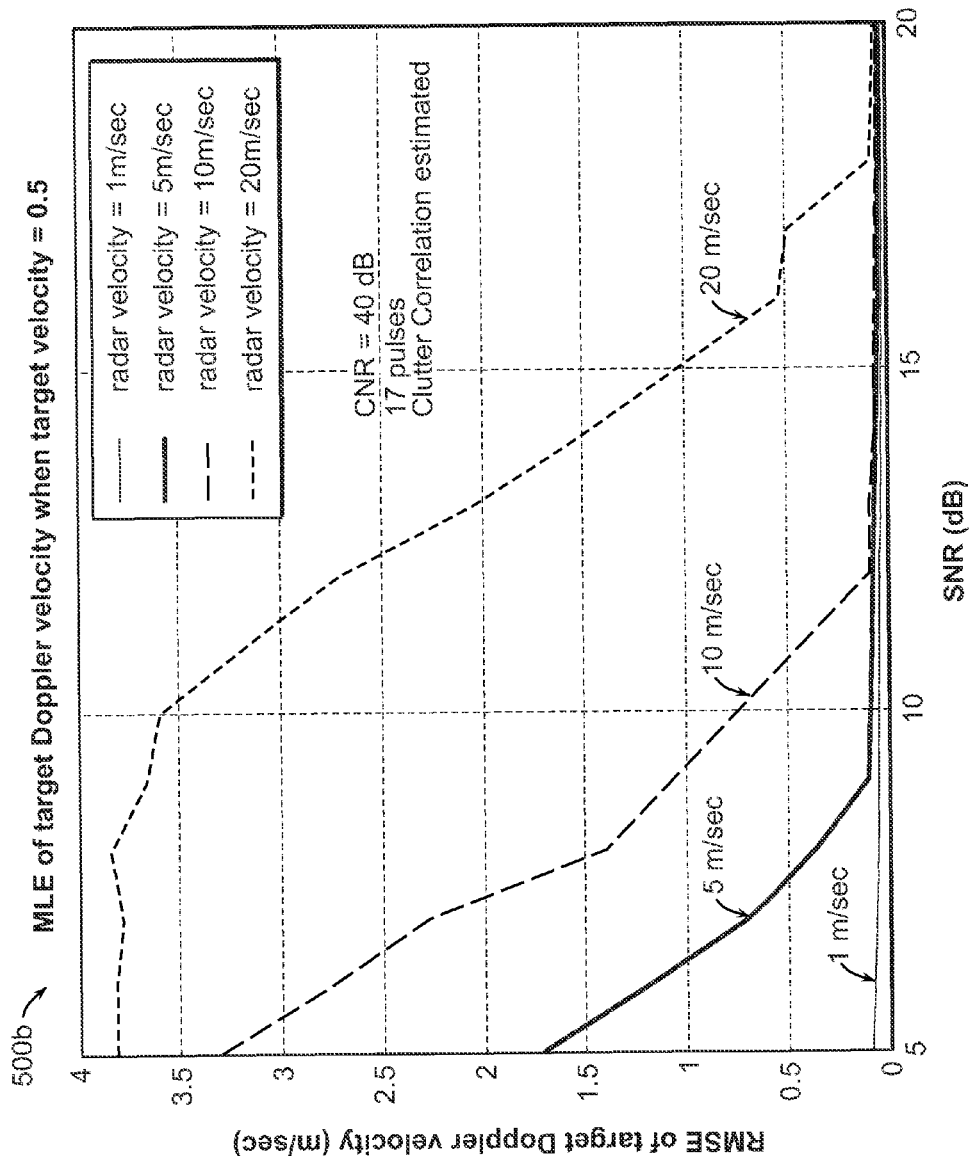

FIG. 5B is a chart 500b illustrating an exemplary radar signal across various radar platform velocities (in this example, 1 meters/second, 5 meters/second, 10 meters/second, and 20 meters/second). FIG. 5B illustrates the Doppler velocity accuracy of an optimal target detector for various target SNRs, platform velocities=1, 5, 10 and 20 msec, target velocity=0.5 msec and clutter-to-noise ratio=30 dB.

Figure 5C:
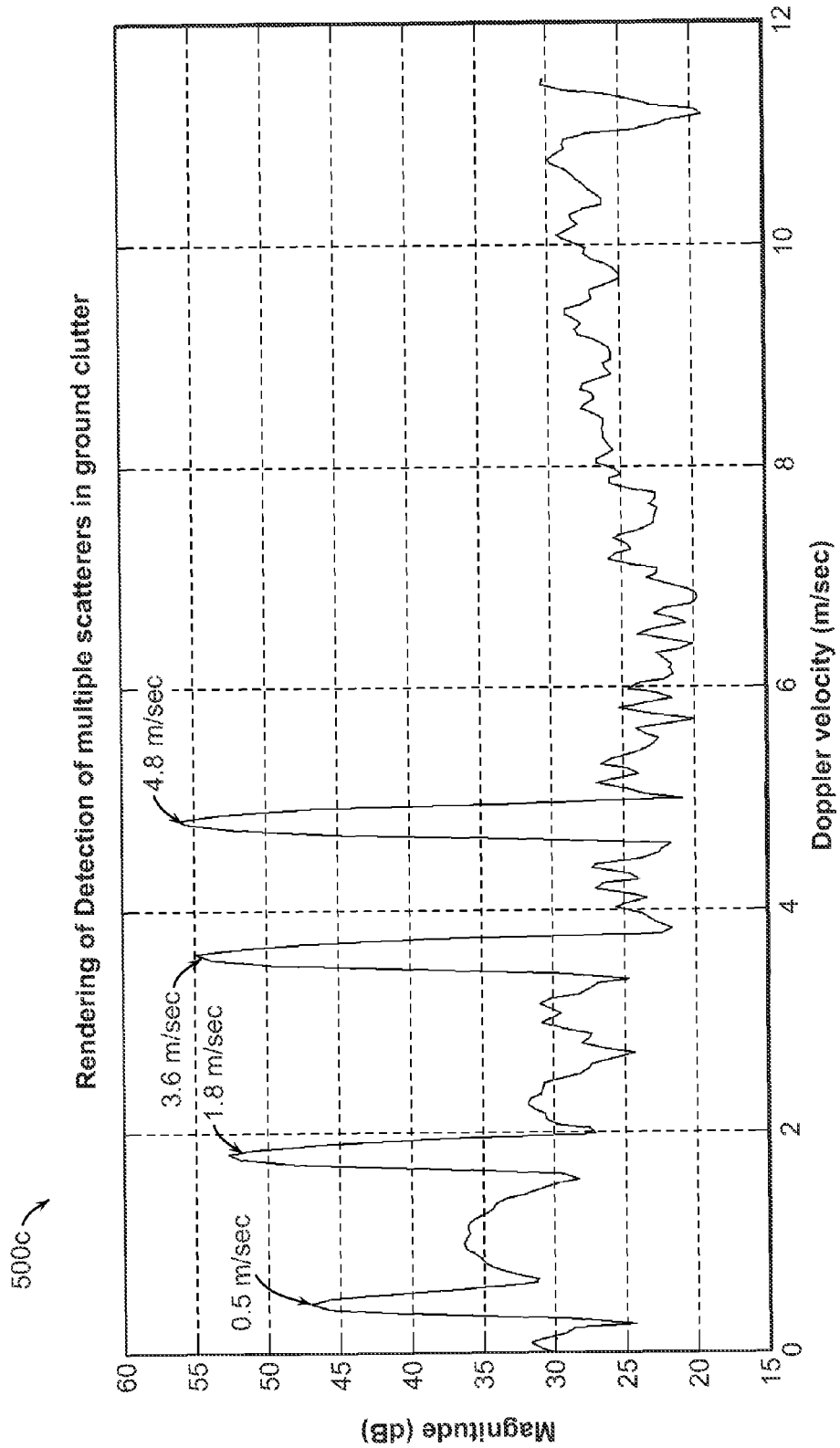

FIG. 5C is a chart 500c illustrating exemplary radar signals across multiple scatters in ground clutter. FIG. 5C illustrates scatterers at: 0.5, 1.8, 3.6 and 4.8 msec with CNR=40 dB; SNR=20 dB; dwell coherent processing interval (CPI)=22 ms; and platform velocity=5 msec.

Figure 6:
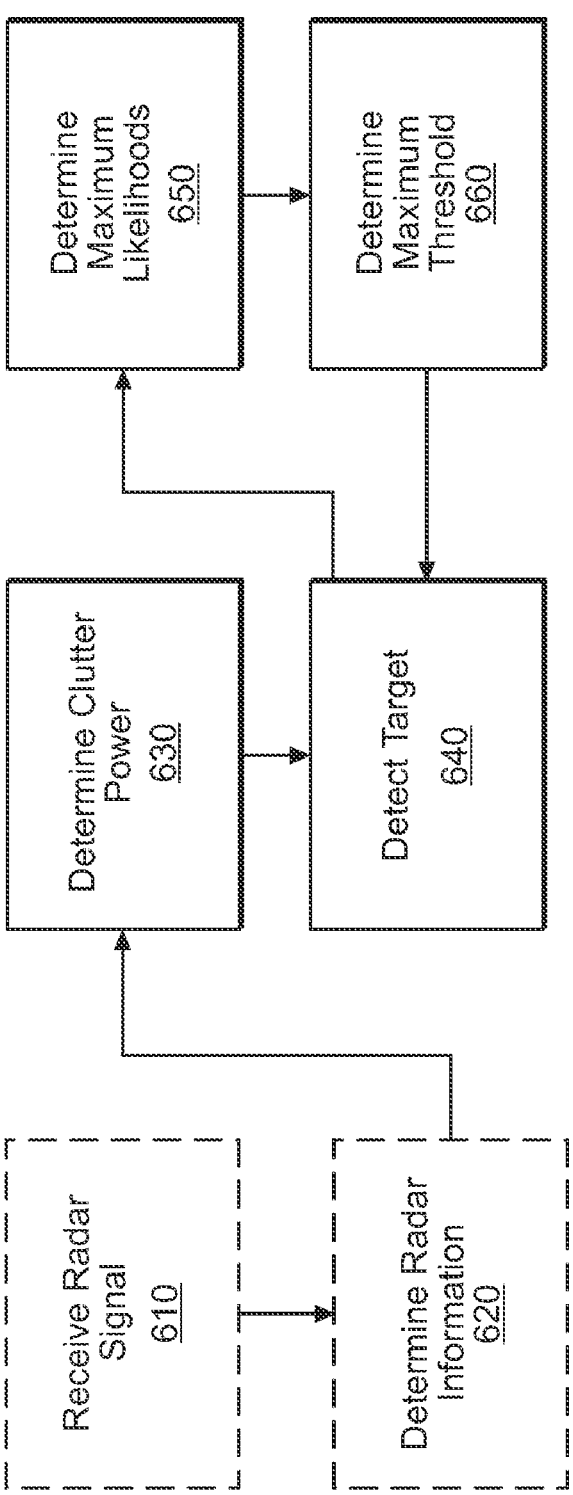
FIG. 6 is a flowchart of an exemplary target detection process.

FIG. 6 is a flowchart 600 of an exemplary target detection process utilizing, for example, the target detection system 310 of FIG. 3. The transceiver 311 receives (610) one or more radar signals. The radar signal processor 316 determines (620) the radar information based on the received radar signal. The radar power determination module 312 determines (630) a clutter power based on radar information associated with the received radar signal. The maximum likelihood determination module 313 determines (640) a plurality of maximum likelihoods from the radar signal within a plurality of substantially equally spaced frequencies and based on the clutter power. The maximum threshold determination module 314 determines (650) a maximum threshold from the plurality of maximum likelihoods and based on the clutter power. The target detection module 315 detects (660) the target based on the maximum threshold and a target detection threshold.

In some examples, the maximum likelihood determination module 313 determines the plurality of maximum likelihoods from the received radar signal within the plurality of substantially equally spaced frequencies and based on the clutter power utilizing a fast fourier transform.

In some examples, the radar information includes radar bandwidth, antenna bandwidth, radar platform velocity, and/or antenna angle. In other examples, the clutter power includes a clutter Doppler spread. In some examples, the clutter power is indicative of a distribution of clutter power density.

In other examples, the determined clutter power Doppler spectral density is calculated in accordance with equation:

$$P_C(f) = \alpha P_C \left( \frac{\sin(\pi f / BW_C)}{\pi f / BW_C} \right)^4$$

wherein:
$P_c$=Clutter Power,
f=frequency, $$BW_C = \text{Doppler bandwidth of clutter} = \left(2\frac{v_r}{\lambda}\sin\theta\right)\Delta\theta_C,$$

$\Delta\theta_c$=peak-to-null antenna beamwidth/3-dB beamwidth,
$v_r$=radar platform velocity,
$\alpha$=3/2, and
$\theta$=angle of antenna boresight to platform velocity.

In some examples, the determined maximum threshold is calculated in accordance with equation:

$$f_{k+1} = f_k - Re\left\{ \frac{\vec{x}^* H'(f_k)}{\vec{x}^* H''(f_k)} \right\}$$

wherein ($\vec{x}$) is calculated in accordance with equation:

$$\vec{x} = Ae^{j\phi}\vec{e}(f_D) + \vec{c} + \vec{u}$$

wherein:
$\vec{e}(f_D) = [e^{-j\pi NTf} \ldots e^{j2\pi nTf} \ldots e^{j2\pi NTf}]^t$=target Doppler phase steering vector
$\vec{c}$=clutter vector,
f=frequency,
$\vec{u}$=electronic noise vector, and
$Ae^{j\phi}$=Complex envelope of target; and
T=inter-pulse period.

wherein $H(f_k)$ is calculated in accordance with equation:

$$H(f_k) = \frac{Q^{-1}\vec{e}(f)}{(\vec{e}(f)^* Q^{-1}\vec{e}(f))^{1/2}}$$

wherein:
$\vec{e}(f_D) = [e^{-j2\pi nTf} \ldots e^{j2\pi nTf} \ldots e^{j2\pi NTf}]^t$=target Doppler phase steering vector
wherein (Q) is calculated in accordance with equation:

$$Q(m,n) = E\{(c_m+u_m)(c_n+u_n)^*\} = Q_c(m,n) + Q_u(m,n),$$

$$Q_c(m,n) = \int P_c(f) e^{j2\pi(m-n)Tf} df = P_c(1-(m-n)T \times BW_c),$$

$$Q_u(m,n) = \sigma^2 \delta_{m,n},$$

$P_c$=Clutter power,
$\sigma^2$=electronic noise power, and
m and n=delays in time.

In other examples, the detection of the target is calculated in accordance with equation:

$$\underset{f}{\text{Max}}\left\{ \frac{|\vec{x}^* Q^{-1}\vec{e}(f)|^2}{\vec{e}(f)^* Q^{-1}\vec{e}(f)} \right\} \geq \text{Target Detection Threshold}$$

In some examples, the radar signal is defined by (x) in accordance with equation:

$$x_n = Ae^{j\phi}e^{j2\pi nTf_D} + c_n + u_n$$

wherein:
n=-N, ..., 0, ..., N radar pulses,
$Ae^{j\phi}$=Complex envelope of target,
$f_D$=Target Doppler Frequency,
$c_n$=Clutter return samples
$u_n$=Electronic noise samples, and
T=inter-pulse period.

In other examples, the radar signal includes a plurality of target Doppler frequencies and the radar signal is defined by (x) in accordance with equation:

$$x_n = \sum_{k=1}^{m} A_k e^{j\phi_k} e^{j2\pi nTf_{D,k}} + c_n + u_n$$

wherein:
n=-N, ..., 0, ..., N radar pulses,
$Ae^{j\phi}$=Complex envelope of target,
$f_D$=Target Doppler Frequency,
$c_n$=Clutter return samples,
$u_n$=Electronic noise samples,
m=Number of Target Doppler Frequencies, and
T=inter-pulse period;

wherein ($\vec{e}$) is defined in accordance with equation:

$$E(f_1 \ldots f_m) = [\vec{e}(f_1) \ldots \vec{e}(f_m)]$$

wherein ($f_1$) and ($f_2$) are defined in accordance with equation:

$$\underset{f_1 \ldots f_m}{\text{Max}}$$

$$\{\vec{x}^* Q^{-1} E(f_1 \ldots f_m)(E(f_1 \ldots f_m)^* Q^{-1} E(f_1 \ldots f_m))^{-1} E(f_1 \ldots f_m)^* Q^{-1} \vec{x}\}$$

In some examples, the minimum detection value (MDV) (also referred to as the target detection threshold) is defined in accordance with equation:

$$x_n = \sum_{k=1}^{m} A_k e^{j\phi_k} e^{j2\pi nTF_{D,k}} + c_n + u_n$$

wherein:

n=−N, . . . , 0, . . . , N radar pulses, $Ae^{j\phi}$=Complex envelope of target, $f_D$=Target Doppler Frequency, $c_n$=Clutter return samples, $u_n$=Electronic noise samples, m=Number of Target Doppler Frequencies, and T=inter-pulse period;

Denote the Cholesky decomposition of Q by

Q=R*R

Define the whitened data vector $\vec{y}$ by:

$\vec{y} = (R^*)^{-1} \vec{x}$

In other examples, the MDV for multiple target scatters is modeled utilizing the following steps:

1. Form Forward-Backward data Matrix of dimension: 2(2N/3+1)×(4N/3+1)

$$C_{FB} = \begin{bmatrix} y_{-N} & y_{-N+1} & \cdots & y_{N/3} \\ \vdots & \vdots & \cdots & \vdots \\ y_{-N/3} & y_{-N/3+1} & \cdots & y_N \\ \overline{y}_{N/3} & \cdots & \overline{y}_{-N+1} & \overline{y}_{-N} \\ \vdots & \cdots & \vdots & \vdots \\ \overline{y}_N & \cdots & \overline{y}_{-N/3+1} & \overline{y}_{-N/3} \end{bmatrix}$$

2. Compute the singular value decomposition of $C_{FB}$: $C_{FB} = U\Sigma V^*$

3. Compute the median of lowest ⅔ of the singular values of $C_{FB}$:

4. Define a threshold: thr=$10^{dB/20}\mu_o$; dB=[13–15]

5. Find the number of singular values above thr: $L_{thr} = \#\{\sigma_m > thr\}$ 6. Use L as the target scatterer model order In some examples, the MDV for multiple target scatters is modeled using an estimation of the linear prediction coefficients by an iterated quadratic maximum likelihood (IQML) technique in accordance with the following equations and steps:

$$C \begin{bmatrix} \vec{\alpha} \\ -1 \end{bmatrix} = 0; \text{ where }$$

$$C = \begin{bmatrix} x_{-N} & x_{-N+1} & \cdots & x_{-N+L} \\ x_{-N+1} & x_{-N+2} & \cdots & x_{-N+L+1} \\ \vdots & \vdots & \vdots & \vdots \\ x_{N-L} & x_{N-L+1} & \cdots & x_N \\ \cdots & \cdots & \cdots & \cdots \\ \overline{x}_{-N+L} & \overline{x}_{-N+L-1} & \cdots & \overline{x}_{-N} \\ \overline{x}_{-N+L+1} & \cdots & \cdots & \overline{x}_{-N+1} \\ \vdots & \vdots & \vdots & \vdots \\ \overline{x}_N & \overline{x}_{N-1} & \cdots & \overline{x}_{N-L} \end{bmatrix}$$

$$= \begin{bmatrix} C_F \\ \cdots \\ C_B \end{bmatrix} \text{ Forward – Backward Data Matrix}$$

$\vec{\alpha} = [\alpha_1 \ \alpha_2 \ \ldots \ \alpha_L]^T$ = vector of linear prediction coefficients The MLE of $\vec{\alpha}$ is obtained from by solving for $\vec{\alpha}$ from $$\text{Min}_{\vec{\alpha}} \left\{ \begin{pmatrix} \vec{\alpha} \\ -1 \end{pmatrix}^* C^* (H_\alpha Q H_\alpha^*)^{-1} C \begin{pmatrix} \vec{\alpha} \\ -1 \end{pmatrix} \right\}$$

where $$H_\alpha = \begin{bmatrix} H_{\alpha,u} & 0 \\ 0 & J_{N-L} H_{\alpha,u} J_N \end{bmatrix}$$

$$H_{\alpha,u} = \begin{bmatrix} \alpha_1 & \alpha_2 & \cdots & \alpha_L & -1 & 0 & \cdots & 0 \\ 0 & \alpha_1 & \alpha_2 & \cdots & \alpha_L & -1 & \ddots & \vdots \\ \vdots & \ddots & \ddots & \ddots & \ddots & \ddots & \ddots & 0 \\ 0 & \ddots & 0 & \alpha_1 & \alpha_2 & \cdots & \alpha_L & -1 \end{bmatrix} \text{ is a } (N-L) \times N \text{ matrix}$$

$J_N$ is a reflection matrix of size N×N.

Define the forward and backward data matrices and data vectors by $A_F$=C(1:2N−L+1,1:L) (forward data matrix)

$\vec{b}_F$=C(1:2N−L+1,L+1) (forward data vector)

$A_B$=C(2N−L+2:4N−2L+2,1:L) (backward data matrix)

$\vec{b}_B$=C(2N−L+2:4N−2L+2,L+1) (backward data vector)

Start an iteration for the linear prediction vector $\vec{\alpha}$ $\vec{\alpha} = 0; \vec{\alpha} = [\vec{\alpha}^* -1]^*$ Until iteration converges, i.e., stops changing or exceeds 20 iterations $W_\alpha = H_{\alpha,u} Q H_{\alpha,u}^*$ $A_{F,W} = A_F^* W_\alpha$ $A_{B,W} = A_B^* W_\alpha$ $\vec{\alpha} = (A_{F,W} A_F + A_{B,W} A_B)^{-1} (A_{F,W} \vec{b}_F + A_{B,W} \vec{b}_B)$ Form the linear prediction coefficient polynomial $$P(z) = \xi^L - \sum_{k=1}^{L-1} \alpha_k \xi^{k-1} = 0$$

and find the Doppler frequency $f_k$ of the detected scatterers from the roots $$\xi_k = e^{-2\pi j f_k T} \text{ as}$$

$$f_{d,k} = -\frac{\arg(\xi_k)}{2\pi T}$$

$$x = \begin{bmatrix} x_{-N/2} \\ \vdots \\ x_n \\ \vdots \\ x_{N/2} \end{bmatrix}$$

$$= \begin{bmatrix} e^{j2\pi f_{d,1}\frac{N}{2}T} & \cdots & e^{j2\pi f_{d,K}\frac{N}{2}T} \\ \vdots & \vdots & \vdots \\ e^{-j2\pi f_{d,1}nT} & \cdots & e^{-j2\pi f_{d,K}nT} \\ \vdots & \vdots & \vdots \\ e^{-j2\pi f_{d,1}\frac{N}{2}T} & \cdots & e^{-j2\pi f_{d,K}\frac{N}{2}T} \end{bmatrix} \begin{bmatrix} z_1 \\ \vdots \\ z_K \end{bmatrix} + \begin{bmatrix} N_{-N/2,q} \\ \vdots \\ N_{n,q} \\ \vdots \\ N_{N/2,q} \end{bmatrix}$$

$$\vec{x} = E(f_{d,1}, \ldots, f_{d,K})\vec{z} + \vec{N}_q; z_k = A_k e^{j\phi_k}$$

Figure 7:
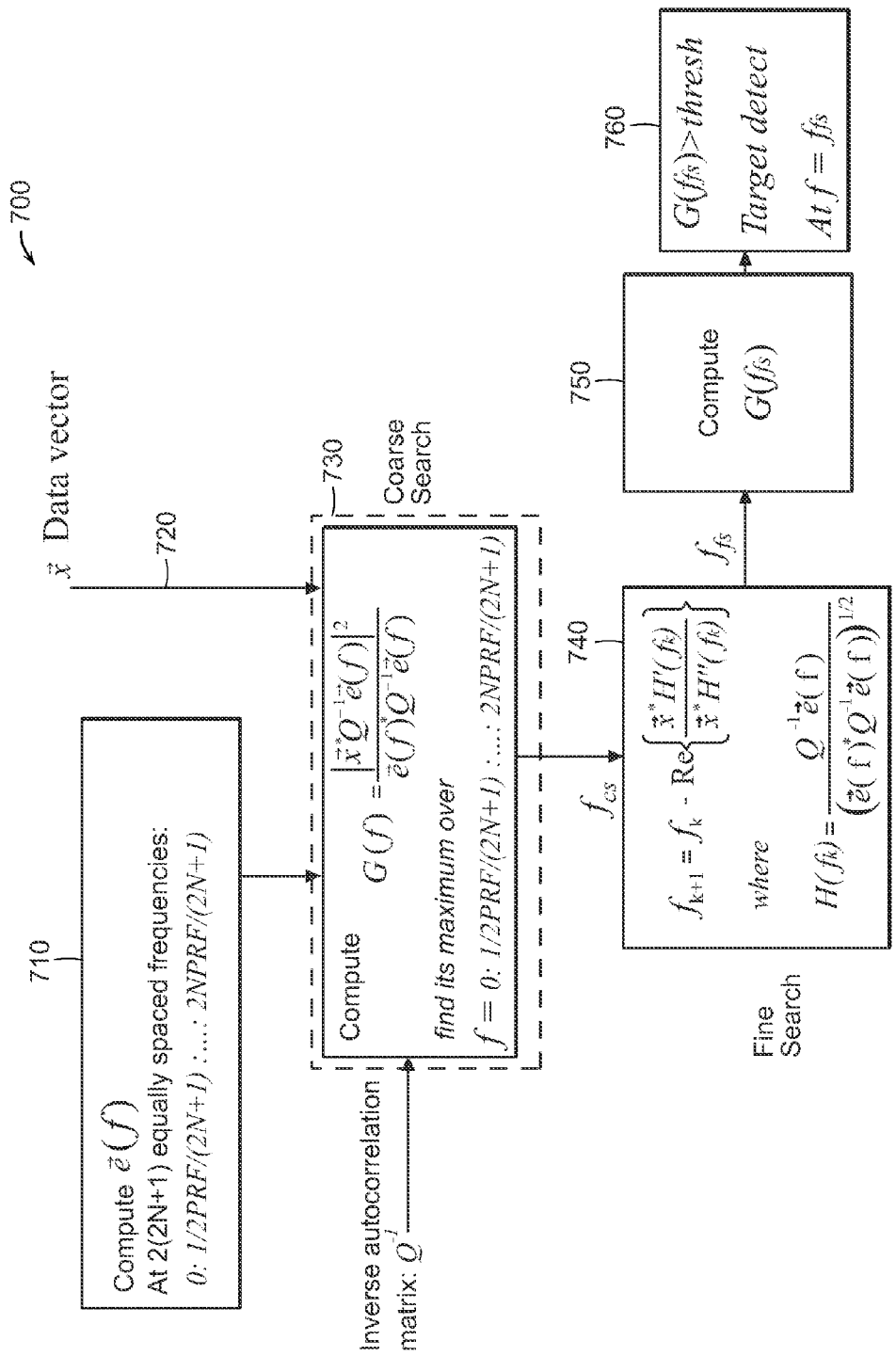
FIG. 7 is a flowchart of another exemplary target detection process.

Solve for the complex envelope vector $\vec{z}$ by
$\vec{z}(E(f_{d,1}, \ldots, f_{d,K})^* E(f_{d,1}, \ldots, f_{d,K}))^{-1} E(f_{d,1}, \ldots f_{d,k})^* \vec{x}$
Scatterers are detected if their corresponding envelope is at least 12 dB above noise in the integrated sense FIG. 7 is a flowchart 700 of another exemplary target detection process utilizing, for example, the target detection system 110 of FIG. 1. The target detection system 110 receives a radar data signal and computes (710) a target Doppler phase steering vector, $\vec{e}(f_D)$, and substantially equally spaced frequencies within the received radar data signal (e.g., within ±0.5%, within ±0.0001%, etc.). The target detection system 110 receives (720) a data vector and splits the data vector into substantially equally spaced frequencies. The target detection system 110 determines (730) a plurality of maximum likelihoods from the received radar signal within the substantially equally spaced frequencies and based on the clutter power (also referred to as a course search). The target detection system 110 determines (740) a maximum threshold from the plurality of maximum likelihoods and based on the clutter power (also referred to as a fine search). The target detection system 110 normalizes (750) the maximum threshold and detects (760) the target based on the maximum threshold and a target detection threshold.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A system for detecting a target, the system comprising:
a radar power determination module configured to determine a clutter power based on radar information associated with a radar signal;
a maximum likelihood determination module configured to determine a plurality of maximum likelihoods from the radar signal within a plurality of substantially equally spaced frequencies and based on the clutter power;
a maximum threshold determination module configured to determine a maximum threshold from the plurality of maximum likelihoods and based on the clutter power; and
a target detection module configured to detect the target based on the maximum threshold and a target detection threshold.

2. The system of claim 1, the system further comprising:
a transceiver configured to receive the radar signal; and
a radar signal processor configured to determine the radar information based on the radar signal.

3. The system of claim 1, wherein the system has a translational velocity of substantially 1 to 20 meters per second.

4. The system of claim 1, wherein the radar signal comprising reflections from a target object, wherein the target object has a Doppler velocity of substantially 0.2 to 5.0 meters per second.

5. The system of claim 1, wherein the maximum likelihood determination module further configured to determine the plurality of substantially equally spaced frequencies based on the clutter power and the radar signal.

6. The system of claim 1, wherein the clutter power comprising clutter Doppler spread.

7. The system of claim 1, wherein the maximum likelihood determination module further configured to determine the plurality of maximum likelihoods from the radar signal within a plurality of substantially equally spaced frequencies and based on the clutter power utilizing a fast fourier transform.

8. The system of claim 1, wherein the maximum threshold determination module further configured to determine the maximum threshold from the plurality of maximum likelihoods and based on the clutter power utilizing Newton's method.

9. A system for detecting a target, the system comprising:
means for determining a clutter power based on radar information associated with a radar signal;
means for determining a plurality of maximum likelihoods from the radar signal within a plurality of substantially equally spaced frequencies and based on the clutter power;
means for determining a maximum threshold from the plurality of maximum likelihoods and based on the clutter power; and
means for detecting the target based on the maximum threshold and a target detection threshold.

10. A method, implemented on a processor, for detecting a target, the method comprising:
determining a clutter power based on radar information associated with a radar signal; and
detecting the target based on a maximum threshold and a target detection threshold, wherein the detecting comprising:
determining a plurality of maximum likelihoods from the radar signal within a plurality of substantially equally spaced frequencies and based on the clutter power, and
determining the maximum threshold from the plurality of maximum likelihoods and based on the clutter power.

11. The method of claim 10, wherein the radar information comprising radar bandwidth, antenna bandwidth, radar platform velocity, antenna angle, or any combination thereof.

12. The method of claim 10, wherein the clutter power comprising clutter Doppler spread.

13. The method of claim 10, wherein the clutter power is indicative of a distribution of clutter power density.

14. The method of claim 10, wherein the determined clutter power is calculated in accordance with equation:

$$P_C(f) = \alpha P_C \left( \frac{\sin(\pi f / BW_C)}{\pi f / BW_C} \right)^4$$

wherein:
$P_c$=Clutter Power,
f=frequency, $$BW_C = \text{Doppler bandwidth of clutter} = \left(2\frac{v_r}{\lambda}\sin\theta\right)\Delta\theta_C,$$

$\Delta\theta_c$=peak-to-null antenna beamwidth/3-dB beamwidth,
$v_r$=radar platform velocity,
$\alpha=\frac{3}{2}$,
$\theta$=angle of antenna boresight to platform velocity, and
$\lambda$=wavelength of the radar signal.

15. The method of claim 10, wherein the determining the plurality of maximum likelihoods from the radar signal within the plurality of substantially equally spaced frequencies and based on the clutter power further comprising determining the plurality of maximum likelihoods from the radar signal within the plurality of substantially equally spaced frequencies and based on the clutter power utilizing a fast fourier transform.

16. The method of claim 10, wherein the determined maximum threshold is calculated in accordance with equation:

$$f_{k+1} = f_k - \text{Re}\left\{\frac{\vec{x}^*H'(f_k)}{\vec{x}^*H''(f_k)}\right\}$$

wherein ($\vec{x}$) is calculated in accordance with equation:

$$\vec{x} = Ae^{j\phi}\vec{e}(f_D) + \vec{c} + \vec{u}$$

wherein:
$\vec{e}(f_D) = [e^{-j2\pi NTf} \ldots e^{j2\pi nTf} \ldots e^{j2\pi NTf}]^t$=target Doppler phase steering vector
$\vec{c}$=clutter vector,
f=frequency,
$\vec{u}$=electronic noise vector,
n=−N, ..., 0, ..., N radar pulses, and
$Ae^{j\phi}$=Complex envelope of target; and
T=inter-pulse period.
wherein $H(f_k)$ is calculated in accordance with equation:

$$H(f_k) = \frac{Q^{-1}\vec{e}(f)}{(\vec{e}(f)^*Q^{-1}\vec{e}(f))^{1/2}}$$

wherein:
$\vec{e}(f_D) = [e^{-j2\pi NTf} \ldots e^{j2\pi nTf} \ldots e^{j2\pi NTf}]^t$=target Doppler phase steering vector
wherein (Q) is calculated in accordance with equation:

$$Q(m,n) = E\{(c_m+u_m)(c_n+u_n)^*\} = Q_c(m,n) + Q_u(m,n),$$

$$Q_c(m,n) = \int P_c(f)e^{j2\pi(m-n)Tf}df = P_c(1-(m-n)T\times BW_c),$$

$$Q_u(m,n) = \sigma^2\delta_{m,n},$$

$P_c$=Clutter power,
$\sigma^2$=electronic noise power, $$BW_C = \text{Doppler bandwidth of clutter} = \left(2\frac{v_r}{\lambda}\sin\theta\right)\Delta\theta_C,$$

$v_r$=radar platform velocity,
$\lambda$=wavelength of the radar signal,
$\Delta\theta_c$=peak-to-null antenna beamwidth/3-dB beamwidth,
$\theta$=angle of antenna boresight to platform velocity, and
m and n=delays in time.

17. The method of claim 16, wherein the detection of the target is calculated in accordance with equation:

$$\text{Max}_f\left\{\frac{|\vec{x}^*Q^{-1}\vec{e}(f)|^2}{\vec{e}(f)^*Q^{-1}\vec{e}(f)}\right\} \geq \text{Target Detection Threshold}$$

18. The method of claim 10, wherein the radar signal is defined by (x) in accordance with equation:

$$x_n = Ae^{j\phi}e^{j2\pi nTf_D} + c_n + u_n$$

wherein:
n=−N, ..., 0, ..., N radar pulses,
$Ae^{j\phi}$=Complex envelope of target,
$f_D$=Target Doppler Frequency,
$c_n$=Clutter return samples,
$u_n$=Electronic noise samples, and
T=inter-pulse period.

19. The method of claim 10, wherein the radar signal comprising a plurality of target Doppler frequencies, wherein the radar signal is defined by (x) in accordance with equation:

$$x_n = \sum_{k=1}^{m} A_k e^{j\phi_k} e^{j2\pi nTf_{D,k}} + c_n + u_n$$

wherein:
n=−N, ..., 0, ..., N radar pulses,
$Ae^{j\phi}$=Complex envelope of target,
$f_D$=Target Doppler Frequency,
$c_n$=Clutter return samples,
$u_n$=Electronic noise samples,
m=Number of Target Doppler Frequencies, and
T=inter-pulse period;
wherein ($\vec{e}$) is defined in accordance with equation:

$$E(f_1 \ldots f_m) = [\vec{e}(f) \ldots \vec{e}(f_m)]$$

wherein ($f_1$) and ($f_2$) are defined in accordance with equation:

$$\underset{f_1 \ldots f_m}{\text{Max}}$$

$$\{\vec{x}^*Q^{-1}E(f_1 \ldots f_m)(E(f_1 \ldots f_m)^*Q^{-1}E(f_1 \ldots f_m))^{-1}E(f_1 \ldots f_m)^*Q^{-1}\vec{x}\}$$

$$Q(m,n) = E\{(c_m+u_m)(c_n+u_n)^*\} = Q_c(m,n) + Q_u(m,n),$$

$$Q_c(m,n) = \int P_c(f)e^{j2\pi(m-n)Tf}df = P_c(1-(m-n)T\times BW_c),$$

$$Q_u(m,n) = \sigma^2\delta_{m,n},$$

$P_c$=Clutter power,
$\sigma^2$=electronic noise power, $$BW_C = \text{Doppler bandwidth of clutter} = \left(2\frac{v_r}{\lambda}\sin\theta\right)\Delta\theta_C,$$

$v_r$=radar platform velocity, m and n=delays in time, $\Delta\theta_C$=peak- to null antenna beamwidth/3-dB beamwidth, $\theta$=angle of antenna boresight to platform velocity, and $\lambda$=wavelength of the radar signal.

20. A computer program product, tangibly embodied in an information carrier, the computer program product including instructions being operable to cause a data processing apparatus to:

determine a clutter power based on radar information associated with a radar signal; and detect the target based on a maximum threshold and a target detection threshold, wherein the detection causes the data processing apparatus to:

determine a plurality of maximum likelihoods from the radar signal within a plurality of substantially equally spaced frequencies and based on the clutter power, and determine the maximum threshold from the plurality of maximum likelihoods and based on the clutter power.

* * * * *